(12) United States Patent
Morel et al.

(10) Patent No.: US 10,845,221 B2
(45) Date of Patent: Nov. 24, 2020

(54) CALIBRATION DEVICE FOR DISTRIBUTING SENSING TECHNOLOGIES

(71) Applicant: OMNISENS SA, Morges (CH)

(72) Inventors: Jacques Morel, Courtepin (CH); Etienne Rochat, Valeyres Sous Ursins (CH)

(73) Assignee: OMNISENS SA, Morges (CH)

( * ) Notice: Subject to any disclaimer, the term of this patent is extended or adjusted under 35 U.S.C. 154(b) by 53 days.

(21) Appl. No.: 16/313,759

(22) PCT Filed: Jun. 27, 2016

(86) PCT No.: PCT/EP2016/064851
§ 371 (c)(1),
(2) Date: Dec. 27, 2018

(87) PCT Pub. No.: WO2018/001450
PCT Pub. Date: Jan. 4, 2018

(65) Prior Publication Data
US 2019/0170547 A1      Jun. 6, 2019

(51) Int. Cl.
*G01N 21/00* (2006.01)
*G01D 18/00* (2006.01)
(Continued)

(52) U.S. Cl.
CPC ......... *G01D 18/00* (2013.01); *G01D 5/35361* (2013.01); *G01D 5/35364* (2013.01);
(Continued)

(58) Field of Classification Search
CPC .......... G01M 11/3145; G01M 11/335; G01M 11/33; G01M 11/3109; G01M 11/338
(Continued)

(56) References Cited

U.S. PATENT DOCUMENTS

2010/0014071 A1* 1/2010 Hartog ............... G01D 5/35361
356/73.1
2013/0274611 A1* 10/2013 Silveira ............... A61B 5/0059
600/476
(Continued)

FOREIGN PATENT DOCUMENTS

GB      2289331 A      11/1995

OTHER PUBLICATIONS

International Search Report from International Patent Application No. PCT/EP2016/064851, dated Oct. 11, 2016.
(Continued)

*Primary Examiner* — MD M Rahman
(74) *Attorney, Agent, or Firm* — Greer, Burns & Crain, Ltd.

(57) ABSTRACT

A device for calibrating distributing sensing technologies is presented. The device includes an optical fiber, a first input arranged for receiving at least one optical pulse and injecting this at least one optical pulse towards the optical fiber, an output arranged for receiving a backscattered signal generated in the optical fiber.
The optical fiber includes at least one event, each event being a part of the optical fiber and having at least one modified physical state or property that is different from the physical state or property of the rest of the optical fiber.
The device includes structure creating different optical paths for the at least one optical pulse, the different optical paths having different lengths, each optical path passing through the at least one event.
The invention also relates to a process implemented in the device.

36 Claims, 7 Drawing Sheets

(51) Int. Cl.
  *G01D 5/353* (2006.01)
  *G01M 11/00* (2006.01)
  *G01K 11/32* (2006.01)
(52) U.S. Cl.
  CPC ............ *G01K 11/32* (2013.01); *G01M 11/319* (2013.01); *G01K 2011/322* (2013.01)
(58) Field of Classification Search
  USPC ........................................................ 356/73.1
  See application file for complete search history.

(56) References Cited

U.S. PATENT DOCUMENTS

| | | | | |
|---|---|---|---|---|
| 2014/0152982 | A1* | 6/2014 | Gosteli | G01M 11/085 356/300 |
| 2014/0289564 | A1* | 9/2014 | Rugina | G06F 11/0712 714/38.1 |
| 2015/0198503 | A1* | 7/2015 | Leblanc | G01M 11/31 356/73.1 |
| 2016/0025524 | A1* | 1/2016 | Nikles | G01K 11/32 356/73.1 |
| 2016/0041065 | A1* | 2/2016 | L'Heureux | G01M 11/3154 356/73.1 |
| 2016/0258808 | A1* | 9/2016 | Cedilnik | G01B 11/16 |
| 2017/0245796 | A1* | 8/2017 | Zalevsky | A61B 5/14551 |
| 2019/0003879 | A1* | 1/2019 | Bao | G01H 9/004 |

OTHER PUBLICATIONS

Bravo et al., "Micro-Displacement Sensor Combined with a Fiber Ring Interrogated by an Optical Time-Domain Reflectometer", IEEE Sensors Journal (2014), 14(3), pp. 793-796.

Culshaw, Brian, "Optical Fiber Sensor Technologies: Opportunities and—Perhaps-Pitfalls", Journal of Lightwave Technology (2004), 22(1), pp. 39-50.

Kersey, Alan D., "A Review of Recent Developments in Fiber Optic Sensor Technology", Optical Fiber Technology (1996), 2(3), pp. 291-317.

Kurashima et al., "Distributed-Temperature Sensing Using Stimulated Brillouin Scattering in Optical Silica Fibers", Optics Letters (1990), 15(18), pp. 1038-1040.

Niklès et al., "Simple Distributed Fiber Sensor Based on Brillouin Gain Spectrum Analysis", Optics Letters (1996), 21 (10), pp. 758-760.

Seafom, Measurement Specification for Distributed Temperature Sensing + APPENDIX, dated Jan. 2016, pp. 1-38.

Silva et al., "Cavity Ring-Down Technique for Remote Sensing: A Proof-of-Concept for Displacement Measurement", Sixth European Workshop on Optical Fibre Sensors (2016), SPIE Conference Proceedings, vol. 9916, pp. 1-4.

Wang, Chuji, et al., Fiber Loop Ringdown—a Time-Domain Sensing Technique for Multi-Function Fiber Optic Sensor Platforms: Current Status and Design Perspectives, Sensors 2009, 9, pp. 7595-7621.

\* cited by examiner

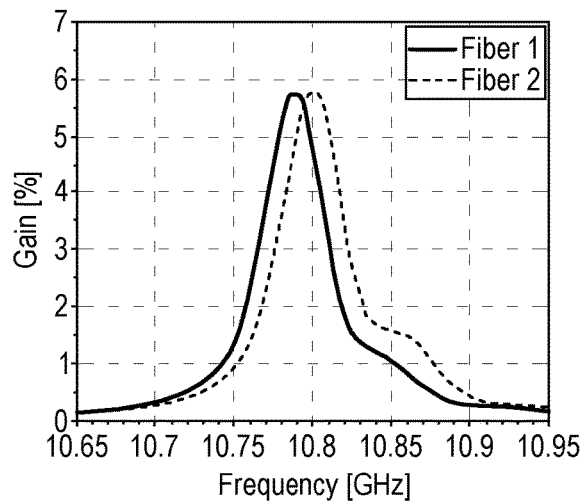
FIG. 7
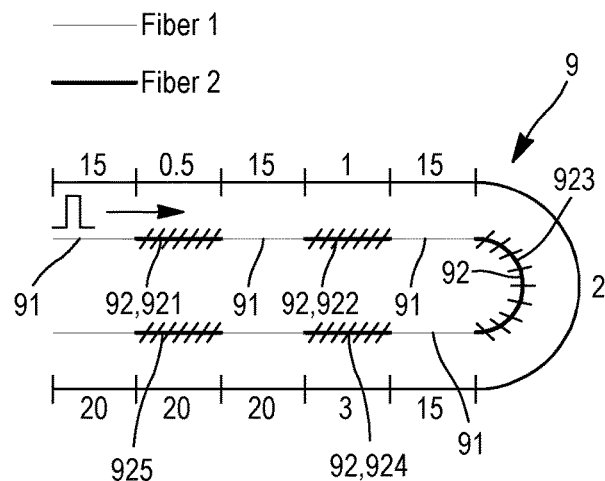
FIG. 8
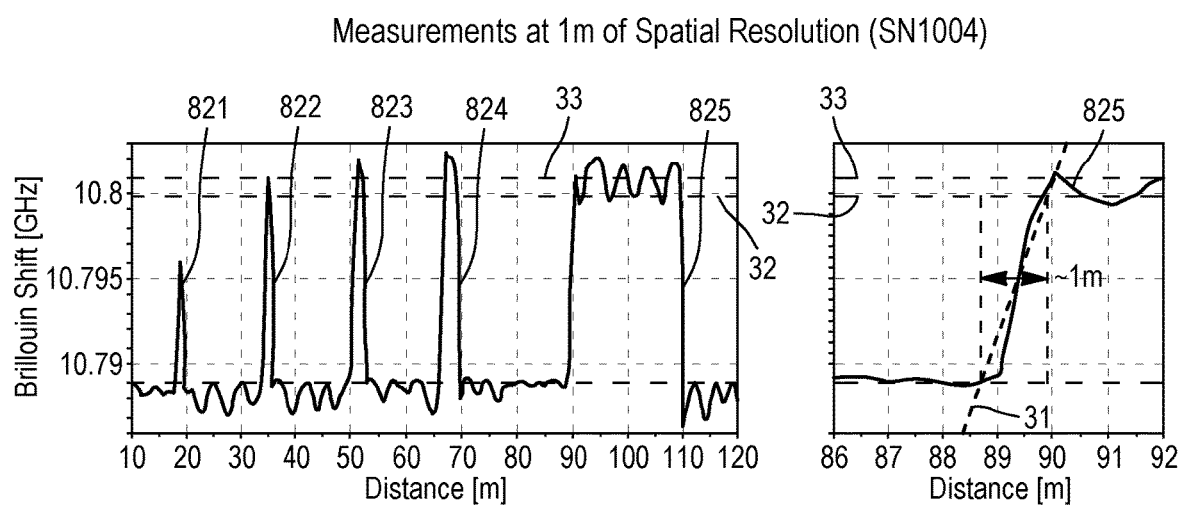
FIG. 9
FIG. 10

CALIBRATION DEVICE FOR DISTRIBUTING SENSING TECHNOLOGIES

BACKGROUND

The present invention relates to a calibration device for distributing sensing technologies.

The invention also relates to a process implemented by a device according to the invention.

When a powerful light pulse of wavelength $\lambda_o$ (or frequency $\nu_o = c/\lambda_o$, where c is the speed of light), known as the pump, propagates through an optical fiber, a small amount of the incident power is scattered in all directions due to local non-homogeneities. Only forward and backward scattering is relevant in single mode optical fibers since the scattered light in other directions is not guided. Backscattering is of particular interest since it propagates back to the fiber end which the laser light was originally launched into. Distributing sensing techniques rely on the analysis of the backscattered signal created at different locations along the fiber ([1]; [2]; [3]).

Scattering processes originate from material impurities (Rayleigh scattering), thermally excited acoustic waves (Brillouin scattering) or molecular vibrations (Raman scattering).

Rayleigh scattering is the interaction of a light pulse with material impurities (a typical example would be the scattering of sunlight by dust particles in the atmosphere giving to the sky different colors depending on the incident angle of the sun light). It is the largest of the three backscattered signals in silica fibers and has the same wavelength as the incident light. Rayleigh scattering is the physical principle behind the "Optical Time Domain Reflectometer" (also called OTDR), "Distributed Acoustic Sensing" (also called DAS). It can be used also for temperature and strain measurement.

Brillouin scattering is the interaction of a light pulse with thermally excited acoustic waves (also called acoustic phonons). Acoustic waves, through the elasto-optic effect, slightly and locally modify the index of refraction. The corresponding moving grating reflects back a small amount of the incident light and shifts its frequency (or wavelength) due to the Doppler Effect. The shift depends on the acoustic velocity in the fiber while its sign (positive or negative shift) depends on the propagation direction of the travelling acoustic waves. Thus, Brillouin backscattering is created at two different frequencies around the incident light, called the Stokes and the Anti-Stokes components. In silica fibers, the Brillouin frequency shift is in the 10 GHz range (0.08 nm in the 1550 nm wavelength range) and is temperature and strain dependent ("Distributed Temperature sensing" also called DTS, and "Distributed Strain Sensing" also called DSS).

Raman scattering is the interaction of a light pulse with thermally excited molecular vibrations (optical phonons) and is the smallest of the three backscattered signals in intensity. Raman scattering exhibits a large frequency shift of typically 13 THz in silica fibers, corresponding to 100 nm at a wavelength of 1550 nm. The Raman Anti-Stokes component intensity is temperature dependent whereas the Stokes component is nearly temperature insensitive so that temperature measurement is possible (DTS).

The back scattering is generated by a pump signal (a few nanoseconds long optical pulse) that propagates along the fiber. Due to the pulsed nature of the pump, the backscattering signal is continuously generated along the fiber and reaches the detector after a time delay equal to twice the travelling time from the fiber input to the specified location.

Thus, monitoring the backscattered intensity, regardless of its type, with respect to time, while knowing the speed of light in the fiber, provides information on the position where the scattering took place. This time of flight measurement is key to all time domain reflectometer systems.

Existing calibration methods for optical time-domain reflectometers, for instance the Recirculating delay line described in IEC 61746 Calibration of "optical time-domain reflectometers" (also called OTDR) illustrated in FIG. 16, only addresses the distance scale. In this calibration method according to prior art, an OTDR pulse 161 is launch in an optical fiber 162, is split by a coupler 163, goes directly or through a loop 164 to a reflective element 165 and comes back using both paths. The corresponding trace (intensity or loss as a function of distance) is made of sharp peaks which spacing corresponds to half the loop length. Provided the loop length is correctly characterized, this allows to calibrate or assess the calibration quality of the OTDR. This method according to prior art is limited to the distance measurement and does not allow calibrating important parameters such as the spatial resolution or the absolute response of the instrument to parameters like temperature, strain or vibrations.

The goal of the invention is to present a method for calibrating distributing sensing technologies and a calibration device for distributing sensing technologies that are not limited to distance measurement.

SUMMARY

An aspect of the invention concerns an optical calibration device comprising an optical fiber, and a first input, the first input being arranged for:
  being connected to a first emitter arranged for emitting at least one optical pulse and/or receiving this at least one optical pulse
  injecting this at least one optical pulse towards the optical fiber the device further comprising an output arranged for:
  receiving a backscattered signal generated in the optical fiber and/or being connected to analysis means arranged for analyzing the backscattered signal generated in the optical fiber,
the optical fiber comprising at least one event, each event being a part of the optical fiber and having at least one modified physical state or property that is different from the physical state or property of the rest of the optical fiber,
the device comprising means for creating different optical paths for the at least one optical pulse, the different optical paths having different lengths, each optical path passing through the at least one event.

The backscattered signal can be a Rayleigh backscattered signal, a Brillouin backscattered signal, and/or a Raman backscattered signal (2 of 3 different types of scattering can be analyzed simultaneously in some cases).

Depending on the Embodiment:
  the at least one event can comprise a part of optical fiber having at least one physical state different compared to the rest of the optical fiber, this at least one different physical state being a temperature, a strain, a pressure, an acoustic vibration, and/or
  the device can comprise means for applying, to the at least one event, at least one known physical state, the means for applying at least one known physical state comprising for example a thermostat, means for applying a known pressure or force or strain, and/or means for applying a known vibration.

The at least one event can comprise a part of optical fiber having at least one physical property different compared to the rest of the optical fiber, this at least one different physical property being for example a spatial dimension, a material or birefringence properties.

The at least one event can comprise a plurality of events, comprising segments of a second type of fiber, the segments of the second type having different lengths, the fiber comprising fiber segments of a first type of fiber, the fiber segments of two different types of fibers being alternately positioned.

All the fibers in the device can be multimode fibers, or all the fibers in the device can be monomode fibers.

The first input and the output are preferably located at the same location.

In a first variant, the means for creating different optical paths can comprise:
a coupler,
an optical loop,
the coupler being inserted into the optical loop, and being arranged in such a way that:
  if an optical signal enters inside the coupler from the loop with a first circulation direction, this optical signal is at least partially re-injected in the loop with the first circulation direction,
  if an optical signal enters inside the coupler from the loop with a second circulation direction, this optical signal is at least partially ejected outside the loop towards the output and/or towards the analysis means.

The coupler can be arranged in such a way that if the optical signal enters inside the coupler from the loop with the first circulation direction, this optical signal is partially re-injected in the loop with the first circulation direction, and is partially ejected outside the loop.

The coupler can be arranged in such a way that if the optical signal enters inside the coupler from the loop with the second circulation direction, this optical signal is partially ejected outside the loop towards the output and/or towards the analysis means, and is partially re-injected in the loop with the second circulation direction.

The device according to the invention can comprise an optical amplifier in the optical loop, said amplifier being arranged for amplifying the optical signal traveling in the loop in the first direction.

The coupler can be located in the loop after the amplifier and before the at least one event, following the first circulation direction.

The at least one event can be in the optical loop or outside the optical loop.

The device according to the invention can further comprise means for avoiding that an optical signal makes two turns or more in the loop following the second circulation direction, these means preferably comprising:
a polarizer in the loop, or
a circulator in the loop.

The coupler can be connected to the first input and/or to the first emitter and can be arranged in such a way that, after being emitted and/or received by the first input, the at least on optical pulse enters the coupler, and is at least partially injected in the loop with the first circulation direction, The coupler can be arranged in such a way that, after being emitted and/or received by the first input, the at least on optical pulse enters the coupler, and is partially injected in the loop with the first circulation direction, and is partially ejected outside the loop.

The device according to the invention can further comprise:
a second input being arranged for:
  being connected to a second emitter arranged for emitting a probe signal, and/or receiving this probe signal injecting this probe signal towards the optical fiber.

The first input and the second input are preferably located at two different locations.

The device according to the invention can further comprise means for injecting the probe in the loop.

The means for injecting the probe in the loop can comprise a circulator, the circulator being inserted into the loop and being connected to the second input and/or to the second emitter, the circulator being arranged in such a way that, after being emitted and/or received by the second input, the probe signal enters the circulator, and is at least partially injected in the loop.

The circulator can be arranged in such a way that, after being emitted and/or received by the second input, the probe signal enters the circulator, and is injected in the loop.

The coupler can be located in the loop after the circulator and before the at least one event, following the first circulation direction.

The amplifier can be located in the loop after the circulator and before the coupler, following the first circulation direction.

It is possible that there is only one possible circulation direction trough the circulator, and the only possible circulation direction trough the circulator in the loop is preferably the first circulation direction, and not the second circulation direction.

The means for injecting the probe in the loop can comprise the coupler.

The means for injecting the probe in the loop can be arranged for at least partially injecting the probe in the loop with the second circulation direction.

The device according to the invention can comprise no means for injecting the probe in the loop, such that the probe cannot be directed into the loop.

The at least one event can be outside the optical loop.

In a second variant, the means for creating different optical paths can comprise a cavity arranged for making the at least one optical pulse signal travelling back and forth.

The at least one event can be in the cavity.

The cavity can be delimited by two fiber Bragg gratings.

In a third variant, the means for creating different optical paths can comprise:
an optical switch arranged for selecting one optical path among the different optical paths, and
couplers linking all the different optical paths.

Another aspect of the invention concerns a calibration process, preferably implemented in the device according to the invention, and characterized in that:
the emitter is connected to the first input and emits the at least one optical pulse,
the analysis means are connected to the output and analyzes the backscattered signal generated by the at least one event in the optical fiber.

The analysis of the backscattered signal can give a measured value of an information concerning the at least one event.

The process according to the invention can comprise the step of comparing the measured value with a reference value of the information.

If the difference between the measured value and the reference value is above a threshold value, the process according to the invention can comprise the step of correcting a calibration of the analysis means used for measuring the measured value.

The information can be:
- a position, a temperature, a strain, a pressure, an acoustic vibration, and/or birefringence properties of one event, and/or
- an amplitude and/or frequency of the backscattered signal corresponding to one event, and/or
- a spatial distance between two different events or difference of length between two of the different optical paths passing through the same event.

The analysis of the backscattered signal can measure a spatial resolution for detecting the at least one event.

The spatial resolution can be calculated from a spatial width of a slope of a backscattered signal corresponding to one event.

The at least one event can comprise a plurality of events, comprising segments of a second type of fiber, the segments of the second type having different lengths, the fiber comprising fiber segments of a first type of fiber, the fiber segments of two different types of fibers being alternately positioned the spatial resolution being measured from different backscattered signals corresponding to the different segments of the second type of fiber.

BRIEF DESCRIPTION OF THE DRAWINGS

Other advantages and characteristics of the invention will appear upon examination of the detailed description of embodiments which are in no way limitative, and of the appended drawings in which:

FIG. 7 illustrates Brillouin gains of the fibers used in the possible embodiment of the at least one event 9 of FIG. 8, FIG. 8 illustrates a possible embodiment of the at least one event 9, FIGS. 9 and 10 illustrate backscattered signals 821, 822, 823, 824, 825 corresponding to the events respectively 921, 922, 923, 924, 925 of FIG. 8.

DETAILED DESCRIPTION

Figure 1:
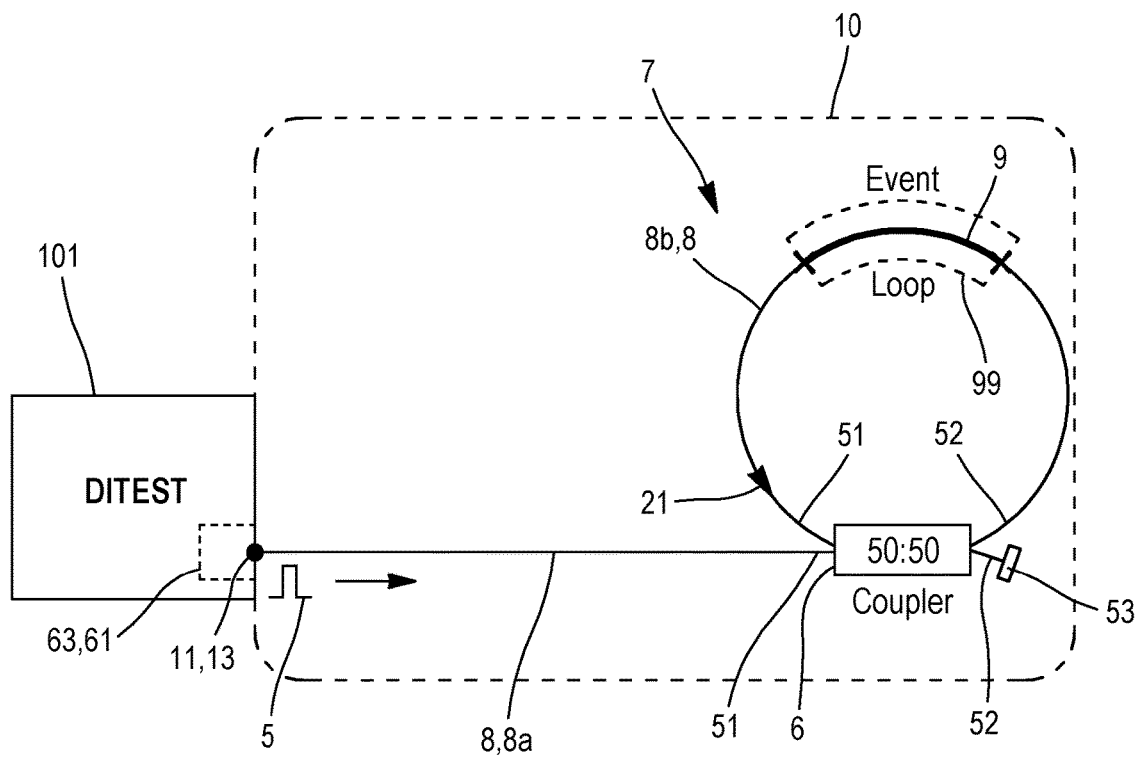
FIG. 1 illustrates a first embodiment of a device 10 according to the invention.

These embodiments being in no way limitative, we can consider variants of the invention including only a selection of characteristics subsequently described or illustrated, isolated from other described or illustrated characteristics (even if this selection is taken from a sentence containing these other characteristics), if this selection of characteristics is sufficient to give a technical advantage or to distinguish the invention over the state of the art. This selection includes at least one characteristic, preferably a functional characteristic without structural details, or with only a part of the structural details if that part is sufficient to give a technical advantage or to distinguish the invention over the state of the art.

We are now going to describe the common features of all embodiments of FIGS. 1 to 15 according to the invention.

In these embodiments of an optical calibration device 10 according to the invention, the device 10 comprises an optical fiber 8.

This fiber 8 is typically a single mode fiber with typically 9 micrometer core designed for 1550 nm laser wavelength.

The device also comprises a first input 11 or connector 11.

The first input 11 is arranged for:
- being connected to a first emitter 61 arranged for emitting at least one optical pulse 5,
- receiving this at least one optical pulse 5,
- injecting this at least one optical pulse 5 towards the optical fiber 8.

The device further comprises an output 13 arranged for:
- receiving a backscattered signal generated in the optical fiber 8,
- being connected to analysis means 63 arranged for analyzing the backscattered signal generated in the optical fiber 8.

Each pulse signal 5 is a light signal, preferably a laser light signal, typically having a wavelength between 1530 nm and 1560 nm The first emitter 61 and/or the analysis means 63 are typically parts of a distributing sensing technology apparatus 101 to be tested or calibrated.

The optical fiber 8 comprises at least one event 9, each event 9 being a part of the optical fiber 8 and having at least one modified physical state or property that is different from the physical state or property of the rest of the optical fiber 8.

The device 10 comprises means 7, 25, 27, 28, 29, 30 for creating different optical paths for the at least one optical pulse 5, the different optical paths having different lengths, each optical path passing through the at least one event 9.

In the device 10, the backscattered signal is a Rayleigh backscattered signal, a Brillouin backscattered signal, or a Raman backscattered signal depending on the tested apparatus 101.

In the device 10:
- the at least one event 9 comprises a part of optical fiber having at least one physical state different compared to the rest of the optical fiber 8, this at least one different physical state being a temperature, a strain, a pressure, an acoustic vibration; and/or the device 10 comprises means 99 for applying, to the at least one event 9, at least one known physical state, the means 99 for applying at least one known physical state comprising for example a thermostat, means for applying a known pressure or force or strain, and/or means for applying a known vibration; and/or the at least one event 9 comprises a part of optical fiber having at least one physical property different compared to the rest of the optical fiber 8, this at least one different physical property being for example a spatial dimension (core diameter), a material (for example: pure silica glass or GeO2 doped silica glass), a refractive index, or birefringence properties (for example a refraction index difference of 10exp-6).

The means 99 for applying a known physical state are for example an oven in the case of temperature, a squeezing mechanism in the case of force, a pressure chamber around the event 9 in the case of pressure, a piezoelectric cylinder around which the event is coiled in the case of strain or vibration.

In the device 10, the first input 11 and the output 13 are located at the same location.

We can now make the distinction between two families of embodiments: the embodiments comprising a loop and the embodiments without a loop.

We are now going to describe the common features of the "loop" embodiments of FIGS. 1 to 13 according to the invention. In these embodiments, the means for creating different optical paths comprises:
 a coupler 6,
 an optical loop 7 of optical fiber,
the coupler 6 being inserted into the optical loop 7 (optically inserted, i.e. inserted in the optical path of the loop 7), and being arranged in such a way that:
 if an optical signal (typically pulse 5) enters inside the coupler 6 from the loop 7 with a first circulation direction 21, this optical signal is at least partially re-injected in the loop 7 with the first circulation direction 21 (and is not or almost not partially ejected outside the loop 7 towards the output 13 and/or towards the analysis means),
 if an optical signal (typically probe 55) enters inside the coupler 6 from the loop 7 with a second circulation direction 22, this optical signal is at least partially ejected outside the loop 7 towards the output 13 and/or towards the analysis means 63.

In these embodiments, the optical fiber 8 comprises two parts:
 one part 8a is outside the optical loop 7, and has a typical length of 10 m and
 one part 8b is inside the optical loop 7, and has a typical length of 4000 m
More precisely:
 the coupler 6 is arranged in such a way that if the optical signal enters inside the coupler 6 from the loop 7 with the first circulation direction 21, this optical signal is partially re-injected in the loop 7 with the first circulation direction 21 (typically 50%), and is partially ejected outside the loop 7 (typically 50%) (but is not or almost not ejected towards the output 13 and/or towards the analysis means 63).
 the coupler 6 is arranged in such a way that if the optical signal enters inside the coupler 6 from the loop 7 with the second circulation direction 22, this optical signal is partially ejected outside the loop 7 towards the output 13 and/or towards the analysis means 63, and is partially re-injected in the loop with the second circulation direction 22.

Each fiber coupler 6 is preferably a 2×2 fused coupler, for example coupler referenced WBC-22-155-50 from Accelink technology with two ports 51 respectively in or out and two opposite ports 52 respectively out or in. When light enters in one of the ports respectively 51 or 52, it goes out by the two opposite ports respectively 52 or 51. One of the ports 52 can be not used, and is typically directed to a beam blocker 53.

The coupler 6 is connected to the first input 11 (and to the first emitter 61) and is arranged in such a way that, after being emitted and received by the first input 11, the at least one optical pulse 5 enters the coupler 6, and is at least partially injected in the loop 7 with the first circulation direction 21 (but is not or almost not ejected towards the output 13 and/or towards the analysis means 63). More precisely, the coupler 6 is arranged in such a way that, after being emitted and/or received by the first input 11, the at least on optical pulse 5 enters the coupler 6, and is partially injected in the loop 7 with the first circulation direction 21, and is partially ejected outside the loop (but is not or almost not ejected towards the output 13 and/or towards the analysis means 63).

FIG. 1 illustrates the first embodiment of device 10 according to the invention. This first embodiment is the simplest "loop" embodiment, and comprises the previously described features.

The at least one event 9 is in the optical loop 7.

This first embodiment is not preferred, because the backscattered signal goes multiple times through the loop 7. The backscattering from the first pulse will go round the loop and interact with the second pulse.

This is avoided in other embodiments by using an EDFA 15 (with embedded isolator) and/or a circulator 4.

Figure 2:
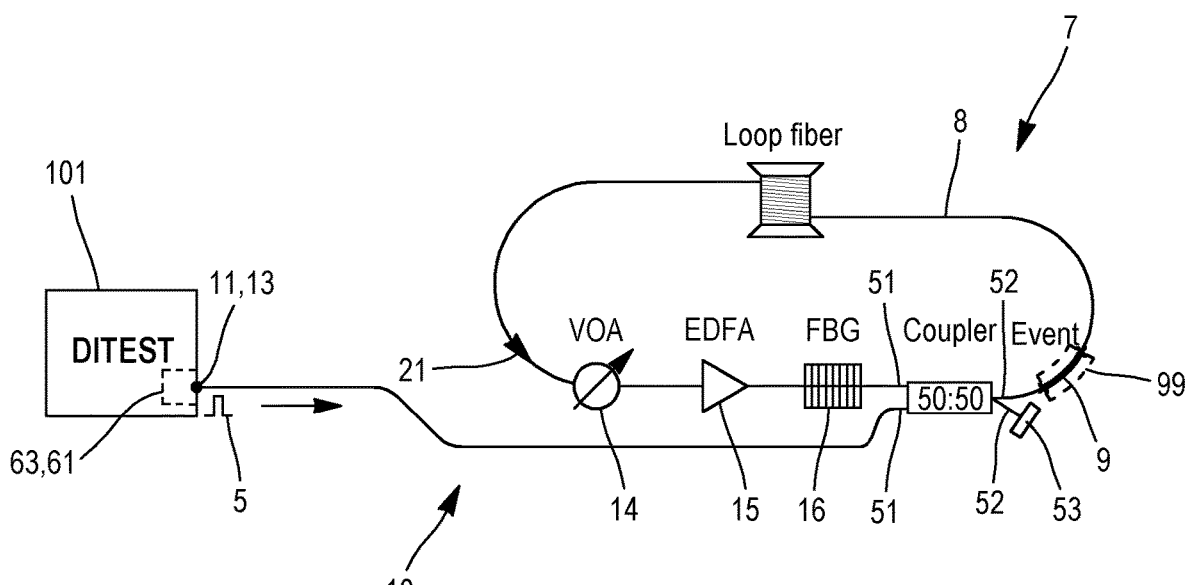
FIG. 2 illustrates a second embodiment of a device 10 according to the invention.

We are now going to describe, in reference to FIG. 2, the second embodiment of a device 10 according to the invention. This second embodiment will be described only for its differences compared to the first embodiment of FIG. 1.

This second embodiment of device 10 comprises an optical amplifier 15 in the optical loop 7.

Said amplifier 15 is arranged for amplifying the optical signal (the at least one pulse 5) traveling in the loop 7 in the first direction 21.

Said amplifier 15 has a gain equal or less than a round trip loss of the loop 7.

The coupler 6 is located in the loop 7 after the amplifier 15 and before the at least one event 9, following the first circulation direction 21.

The optical amplifier 15 is arranged for compensating for the coupler loss and fiber propagation loss on each pump round trip.

An optical amplifier 15 (preferably an erbium-doped fiber amplifier, also called EDFA) is located in the loop 7. The amplified spontaneous emission (also called ASE) from the EDFA is filtered out using an ASE filter 16 (typically by reflection of the desired signal on a fiber Bragg grating also called FBG connected to a non-illustrated circulator) or with a non-illustrated thin film filter (TFT).

A Variable Optical Attenuator 14 (also called VOA) is used to adjust the EDFA gain and prevent the loop 7 to oscillate as a ring fiber laser; alternatively, gain can be adjusted by modifying the EDFA pump laser current, i.e. without attenuator 14.

Figure 3:
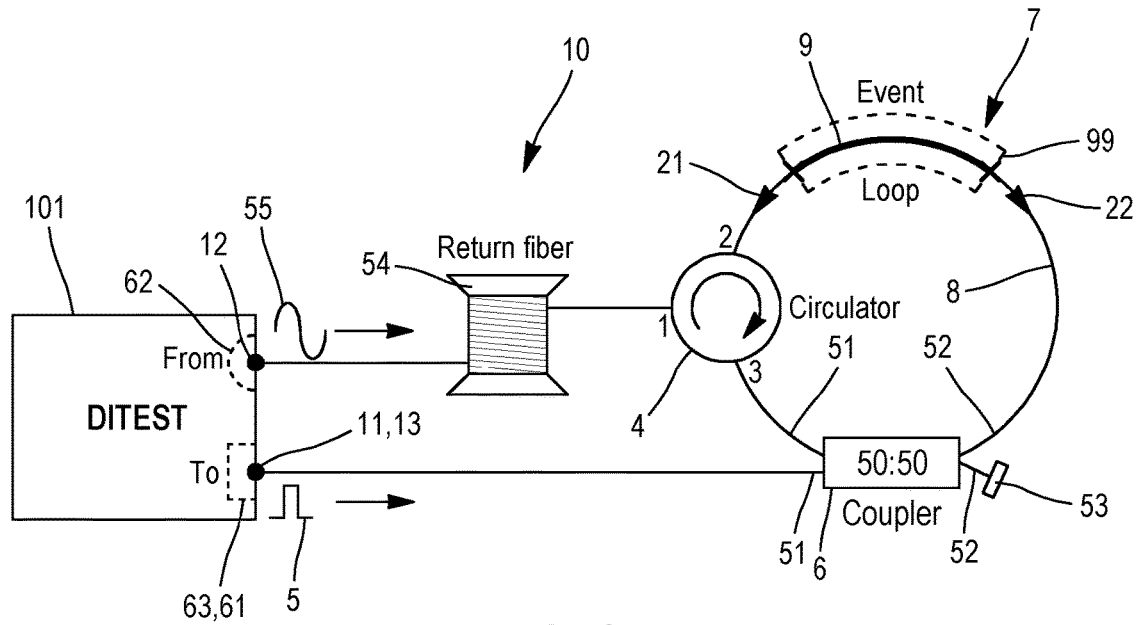
FIG. 3 illustrates a third embodiment of a device 10 according to the invention.

We are now going to describe, in reference to FIG. 3, the third embodiment of a device 10 according to the invention. This third embodiment will be described only for its differences compared to the first embodiment of FIG. 1.

This third embodiment is used for Brillouin Optical Time Domain Analyzers (also called "BOTDA")

In this third embodiment, the device 10 further comprises a second input 12 or connector 12 arranged for:

being connected to a second emitter 62 arranged for emitting a continuous probe signal 55, and receiving this continuous probe signal injecting this continuous probe signal towards the optical fiber 8.

The probe signal 55 is a light signal, preferably a laser light signal, typically having a wavelength between 1530 nm and 1560 nm.

The first input 11 and the second input 12 are located at two different locations.

The device 10 further comprises means for injecting the continuous probe 55 in the loop 7.

The means for injecting the continuous probe 55 in the loop 7 comprises a circulator 4, the circulator 4 being inserted into the loop 7 and being connected to the second input 12 and/or to the second emitter 62, the circulator 4 being arranged in such a way that, after being emitted and/or received by the second input 12, the continuous probe signal 55 enters the circulator 4, and is at least partially injected in the loop 7 with the second circulation direction 22. More precisely, the circulator 4 is arranged in such a way that, after being emitted and/or received by the second input 12, the continuous probe signal 55 enters the circulator 4, and is (preferably entirely or almost entirely) injected in the loop 7 with the second circulation direction 22.

In this description, each optical circulator 4, 40, 41, 42, 43 is a fiber-optic component, and is a at least three-port device (preferably a three- or four-port device) designed such that light entering any port exits from the next. Preferably, in this description, each optical circulator 4, 40, 41, 42, 43 is a three-port device comprising three ports referenced respectively 1, 2 and 3, and arranged in such a way that light can only go from port 1 to port 2 and from port 2 to port 3 (except for the "special" circulator 40, allowing also form port 3 to port 1).

Each circulator 4, 40, 41, 42, 43 is for example a circulator referenced CIR-3-155 from Accelink technology The circulator 4 allows the probe 55 to enter the loop 7 (port 1 to port 2) and to travel only one round trip (port 3 is an exit only). The pump 5 is travelling in the other direction 21 and goes round the loop 7 using the port 2 to port 3 path. The return fiber 54 (with a typical length of 50 km) is not mandatory and the coupling ratio of the coupler 6 has been arbitrarily set to 50/50.

The coupler 6 is located in the loop 7 after the circulator 4 and before the at least one event 9, following the first circulation direction 21.

The only possible circulation direction trough the circulator 4 in the loop 7 is the first circulation direction 21, and not the second circulation direction 22.

The means for injecting the continuous probe 55 in the loop 7 are arranged for at least partially injecting the continuous probe 55 in the loop 7 with the second circulation direction 22.

The device 10 further comprises means for avoiding that an optical signal makes two turns or more in the loop 7 through the at least one event 9 following the second circulation direction 22 (these means comprising the circulator 4 in the loop 7).

The frequency information of Brillouin backscattered light (wavelength/frequency position with respect to the original laser light) can be exploited to measure the local temperature or strain information along the optical fiber 8. The technique refers to as a frequency-based technique since the temperature or strain information is contained in the Brillouin frequency shift.

The Brillouin scattering process has the peculiarity that it can be stimulated by a second optical signal in addition to the light wave 5 that generates the scattering, providing that this second signal, called the probe 55, fulfils specific conditions. This is an especially interesting property for sensing application and can be achieved by the use of a probe beam 55 counter propagating with respect to the pump 5. Stimulation is maximized when pump and probe frequencies (or wavelengths) are exactly separated by the Brillouin shift. In this case, the energy transferred from the pump 5 to the probe 55 results shows a greatly enhanced backscattered intensity and thus a larger Signal-to-Noise Ratio (also called SNR). This is seen as a resonant phenomenon where an amplification of the probe power occurs at the expense of the pump when the resonant condition is fulfilled, i.e. when the frequency difference between pump 5 and probe 55 matches the local Brillouin frequency. In other words the scattering process is stimulated by the injection of the probe signal 55.

Scanning the probe frequency with respect to the pump while monitoring the intensity of the backscattered signal allows the Brillouin gain peak to be found, and thus the corresponding Brillouin shift, from which the temperature or the strain can be computed [5].

The stimulation process can be achieved by using a single laser from which both the pump beam 5 (a few nanoseconds long optical pulse) and the probe beam 55 (Continuous Wave—CW light) are created. A telecommunication-like optical modulator is used to scan the probe frequency in a controlled manner. This probe beam 55 is sent to the end of the sensing region by using a second optical fiber.

Due to the pulsed nature of the pump 5, the pump/probe interaction takes place at different locations along the fiber at different times. For any given location (t1), the portion of probe signal 55 which interacted with the pump 5 arrives on the detector 63 after a time delay equal to the travelling time from the fiber input to the specified location.

Thus, monitoring the backscattered intensity with respect to time, while knowing the speed of light in the fiber 8, provides information on the position where the scattering took place.

The combination of the time domain analysis together with the frequency analysis provides the distribution of temperature or strain along the optical fiber [4].

Instruments 101 based on Stimulated Brillouin Backscattering (SBS) are known as Brillouin Optical Time Domain Analyzers or (BOTDA), also sometimes known as dual-end instrumentation, as opposed to "Brillouin Optical Time Domain Reflectometers" (also called BOTDR) which are based on spontaneous Brillouin backscattering (known as single-end) and do not use a probe beam 55.

Figure 4:
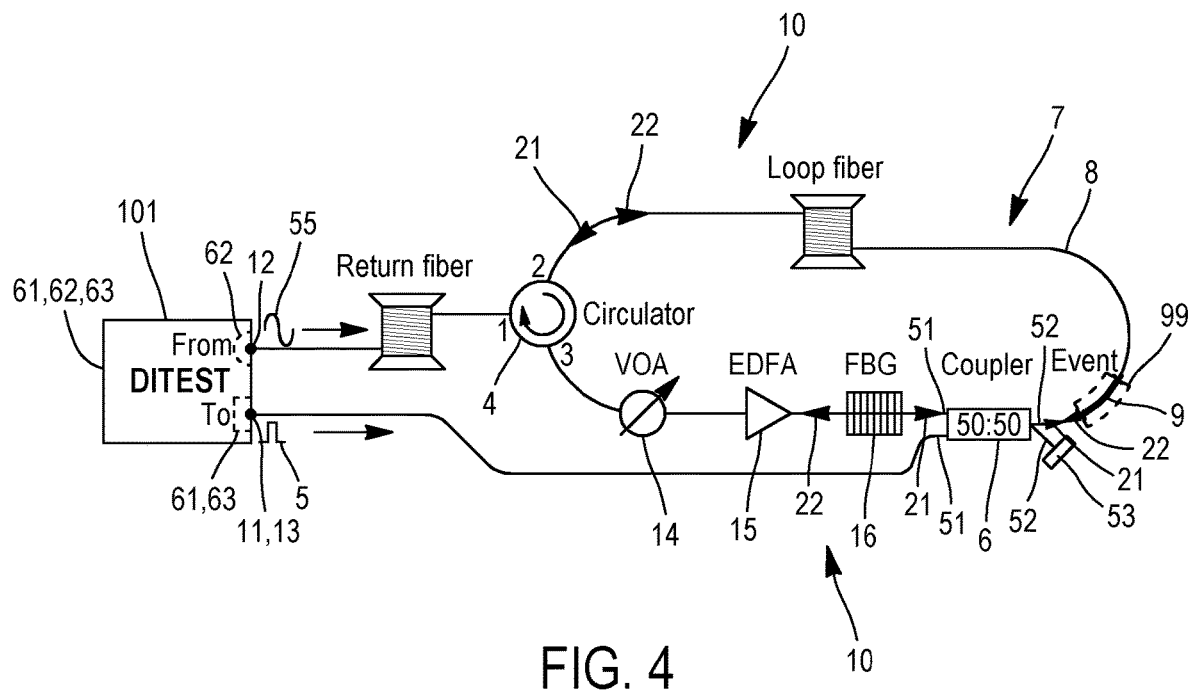
FIG. 4 illustrates a fourth embodiment of a device 10 according to the invention.

We are now going to describe, in reference to FIG. 4, the fourth embodiment of a device 10 according to the invention. This fourth embodiment is the combination of:

the second embodiment of FIG. 2, and the third embodiment of FIG. 3, and thus comprises the features already described previously.

Furthermore, in this fourth embodiment, the amplifier 15 is located in the loop 7 after the circulator 4 and before the coupler 6, following the first circulation direction 21.

The optical amplifier 15 (preferably an erbium-doped fiber amplifier, also called EDFA) is located between the circulator port 3 and the coupler 6 so that no gain is provided to the probe 55.

Figure 11:
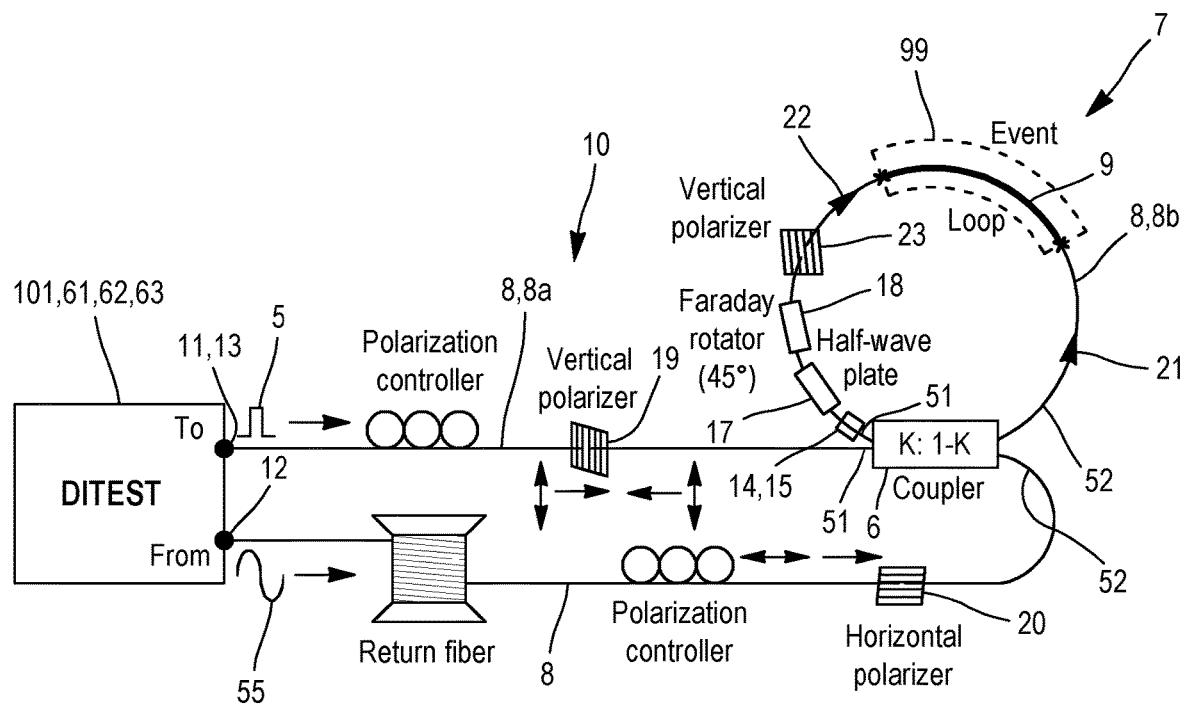
FIG. 11 illustrates a fifth embodiment of a device 10 according to the invention.

We are now going to describe, in reference to FIG. 11, the fifth embodiment of a device 10 according to the invention. This fifth embodiment will be described only for its differences compared to the fourth embodiment of FIG. 4.

In this fifth embodiment, the means for injecting the continuous probe 55 in the loop 7 does not comprise the circulator 4, but comprises the coupler 6.

Furthermore, the means for avoiding that that any optical signal (the probe 55) makes two turns or more in the loop 7 through the at least one event 9 following the second circulation direction 22 comprise:
- a half wave plate 17 in the loop 7,
- a faraday rotator 18 in the loop 7,
- a first polarizer 19 between the input 11 and the coupler 6 or the loop 7,
- a second polarizer 20 between the input 12 and the coupler 6 or the loop 7, the first and second polarizers 19, 20 having two orthogonal polarization directions,
- another polarizer 23 in the loop 7.

The embodiment of FIG. 11 manages the recirculation of the probe 55 by relying on the manipulation of the state of polarization (also called SOP) of the signals involved. In particular, it takes advantage of the counter propagating nature of the pump 5 and probe 55 by making use of a combination of a reciprocal device i.e. the half-wave plate 17 and a non-reciprocal device i.e. the Faraday rotator 18 (also called FR).

The polarization of the pump signal 5 is first aligned with one of the axis of the polarization-maintaining fiber 8a (also called PM fiber) before being coupled to the loop 7 (vertical polarization here).

Similarly, the polarization of the probe signal 55 is aligned orthogonally to the one of the pump (i.e. horizontally).

Properly aligned polarizers 19, 20 ensure clean SOP at entrance of the loop.

Due to its direction of propagation, the pump 5 will retrieve its original SOP after its travel through the half-wave plate 17 and the Faraday rotator 18. These devices are indeed designed such that their contributions cancel each other for the pump signal 5. The Faraday rotator 18 always induces a rotation of +45° to a linear polarization at its input while the half-wave 17 plate rotates a linear polarization by −45° for a signal travelling in the direction 21 of the pump and by +45° for a signal travelling in the direction 22 of the probe 55. As a consequence, when the probe 55 is being coupled to the loop 7, the action of the half-wave plate 17 and the rotator 18 make its SOP change from "horizontal" to "vertical", allowing for the probe 55 to go safely through the "vertical" polarizer 23 and interact with the pump signal 5. After its first trip through the loop 7, the half-wave plate 17 and rotator 18 again turn the linear SOP of the probe 55 by 90°, such that the latest retrieves an "horizontal" SOP which is getting stopped by the polarizer 23 thus preventing the probe from recirculating.

For this to be achieved, the light at entry of the half-wave plate 17 must be coupled with an angle of 22.5° with respect to its optical axes. This can be shown by making use of Jones matrices. Let us consider the matrices corresponding to the half-wave plate 17 $J_{\lambda/2}$ and the Faraday rotator 18 $J_{FR}$. The fast axis of the half-wave plate 17 is supposed to make an angle of 22.5° with respect to an input horizontal polarization.

$$J_{\lambda/2} = \frac{1}{\sqrt{2}}\begin{pmatrix} 1 & 1 \\ 1 & -1 \end{pmatrix}$$

$$J_{FR} = \frac{1}{\sqrt{2}}\begin{pmatrix} 1 & -1 \\ 1 & 1 \end{pmatrix}$$

The pump 5 $V_\theta^{pump}$ is considered to be vertically polarized. It first goes through the rotator 18 before entering the half-wave plate 17. The pump's output SOP $v_{out}$ is therefore equal to:

$$V_{out}^{pump} = J_{\lambda/2}J_{FR}V_\theta^{pump} =$$

$$\frac{1}{2}\begin{pmatrix} 1 & 1 \\ 1 & -1 \end{pmatrix}\begin{pmatrix} 1 & -1 \\ 1 & 1 \end{pmatrix}\begin{pmatrix} 0 \\ 1 \end{pmatrix} = \begin{pmatrix} 1 & 0 \\ 0 & -1 \end{pmatrix}\begin{pmatrix} 0 \\ 1 \end{pmatrix} = \begin{pmatrix} 0 \\ -1 \end{pmatrix} = e^{-i\pi}\begin{pmatrix} 0 \\ 1 \end{pmatrix}$$

which is also vertical despite being affected by a π phase shift. One can easily verify that a horizontal input polarization results in a horizontal output polarization.

The probe 55 first enters the half-wave plate 17 before going through the rotator 18. Because of the properties of these devices, their Jones matrices remain unchanged when considering an inversion in the direction of propagation. If the probe 55 $v_\theta^{probe}$ is also vertically polarized, it will exit the concatenated elements with the following SOP:

$$V_{out}^{probe} = J_{FR}J_{\lambda/2}V_\theta^{probe} = \frac{1}{2}\begin{pmatrix} 1 & -1 \\ 1 & 1 \end{pmatrix}\begin{pmatrix} 1 & 1 \\ 1 & -1 \end{pmatrix}\begin{pmatrix} 0 \\ 1 \end{pmatrix} = \begin{pmatrix} 0 & 1 \\ 1 & 0 \end{pmatrix}\begin{pmatrix} 0 \\ 1 \end{pmatrix} = \begin{pmatrix} 1 \\ 0 \end{pmatrix}$$

which corresponds to a horizontal polarization. One can easily readily check that a vertical input polarization results in a horizontal output polarization. It clearly appears that the pump signal 5 always maintain its polarization state while the probe signal's polarization undergoes a 90° rotation after its travel through the Faraday rotator 18 and the half-wave plate 17.

One of the advantages of the use of PM fibers is that the Brillouin gain is enhanced (actually maximized) when the counter propagating signals are linearly polarized along the same axis. It is of particular interest here as one is interested in detecting the highest number of events 9. A higher interaction level will therefore increase the signal to noise ratio (SNR) and improve the repeatability of the measurements. It is possible to use an all-fibered half-wave plate 17 or a fiber to free-space interfaces to insert the half-wave plate 17 in the loop 7. The fibered half-wave plate 17 can be manufactured by manipulating PM fibers.

Figure 12:
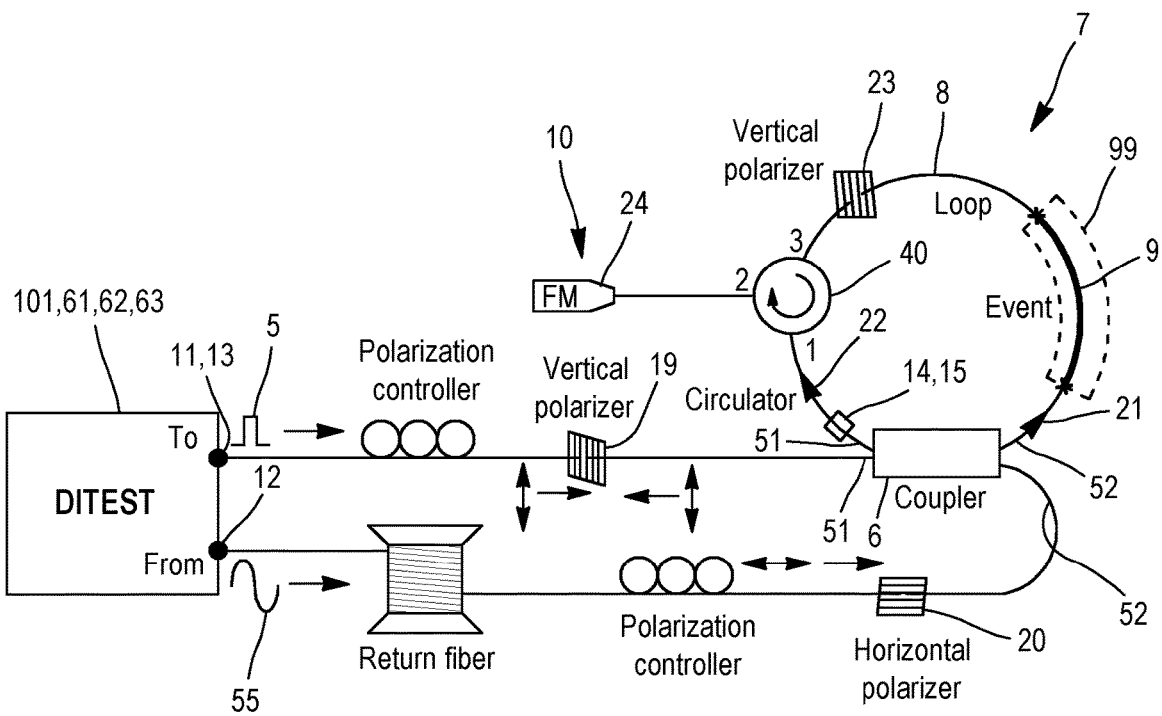
FIG. 12 illustrates a sixth embodiment of a device 10 according to the invention.

We are now going to describe, in reference to FIG. 12, the sixth embodiment of a device 10 according to the invention. This sixth embodiment will be described only for its differences compared to the fifth embodiment of FIG. 11.

The functionality obtained using the setup described in FIG. 11 can be equivalently implemented using the setup illustrated in FIG. 12.

The Faraday rotator 18 and half wave plate 17 are being replaced by a Faraday mirror 24 and a "special" circulator 40.

Figure 17:
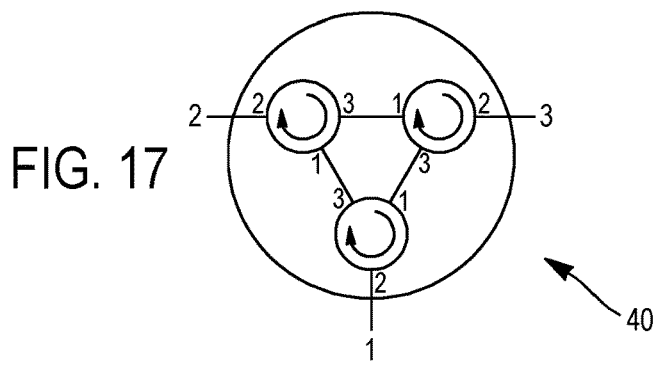

The ports of this circulator 40 must indeed all work as inputs such that a signal incoming at port 3 is redirected towards port 1. As a result from the mechanism being exploited to manufacture them, optical circulators normally don't exhibit such behavior. This setup therefore requires acquiring a custom circulator 40 or retrieving the desired functionality by making use of three standard circulators in a triangle scheme (FIG. 17). The last option obviously reduces the performances of the system as a consequence from high insertion losses.

Figure 13:
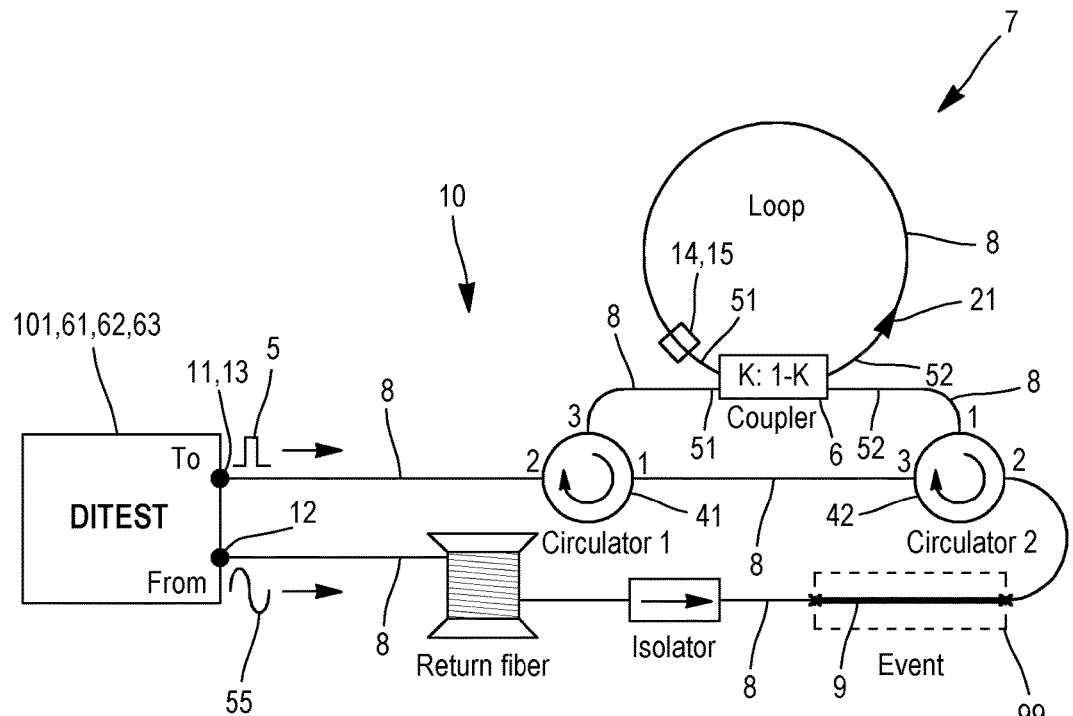
FIG. 13 illustrates a seventh embodiment of a device 10 according to the invention.

We are now going to describe, in reference to FIG. 13, the seventh embodiment of a device 10 according to the invention. This seventh embodiment will be described only for its differences compared to the fourth embodiment of FIG. 4.

In this seventh embodiment, the at least one event 9 is outside the optical loop 7.

The device 10 is arranged for not injecting the continuous probe 55 in the loop 7. In other words, the device 10 comprises no means for injecting the continuous probe 55 in the loop 7, such that the continuous probe 55 cannot be directed into the loop 7.

The device 10 comprises two circulators 41, 42 outside the loop 7 and at two different sides of the coupler 6:
one circulator 41 between:
the input 11 and
the coupler 6 and/or the loop 7,
one circulator 42 between:
the input 12 and/or the at least one event 9 and
the coupler 6 and/or the loop 7.
Each circulator respectively 41, 42 has thus three ports:
one port 2 linked (through an optical fiber) to the input respectively 11 or 12
one port respectively 1 or 3 linked (through an optical fiber) to the other circulator 42 or 41
one port respectively 3 or 1 linked (through an optical fiber) to the coupler 6.

It is possible to locally dissociate the paths taken by the probe 55 and the pump 5 by making use of the two circulators 41, 42 as depicted in FIG. 13. In this configuration, only the pulsed pump signal 5 goes multiple times through the loop 7 while the CW probe signal 55 travels directly towards the sensor 63. Compared to the setup using a single circulator (FIG. 4), this setup offers the advantage of increased probe amplitude, as the latest won't go through the coupler 6 which will very likely have a coupling ratio typically of 50:50.

Some considerations have however to be taken into account regarding the different times of flight involved, in particular the fact that only the pulse 5 is being delayed by the loop 7 such that pump signal 5 and probe signal 55 travel on different paths. As the tested apparatus 101 computes the distance from a time equal to the time required to reach the event 9 from the sensor, it will be necessary to post-process the distance information furnished by the apparatus 101.

Figure 14:
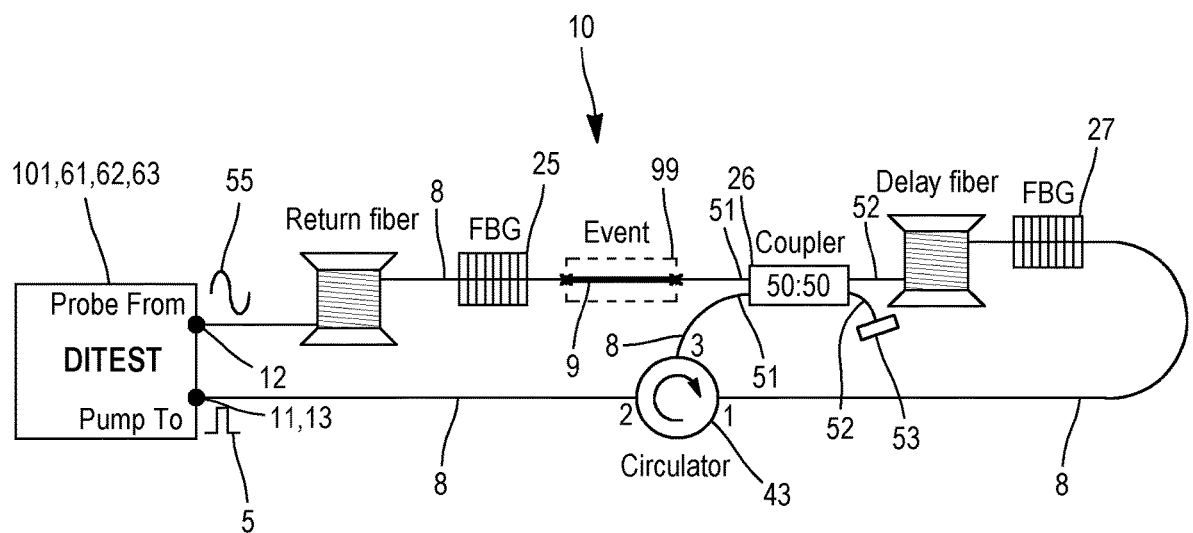
FIG. 14 illustrates an eighth embodiment of a device 10 according to the invention.
Figure 15:
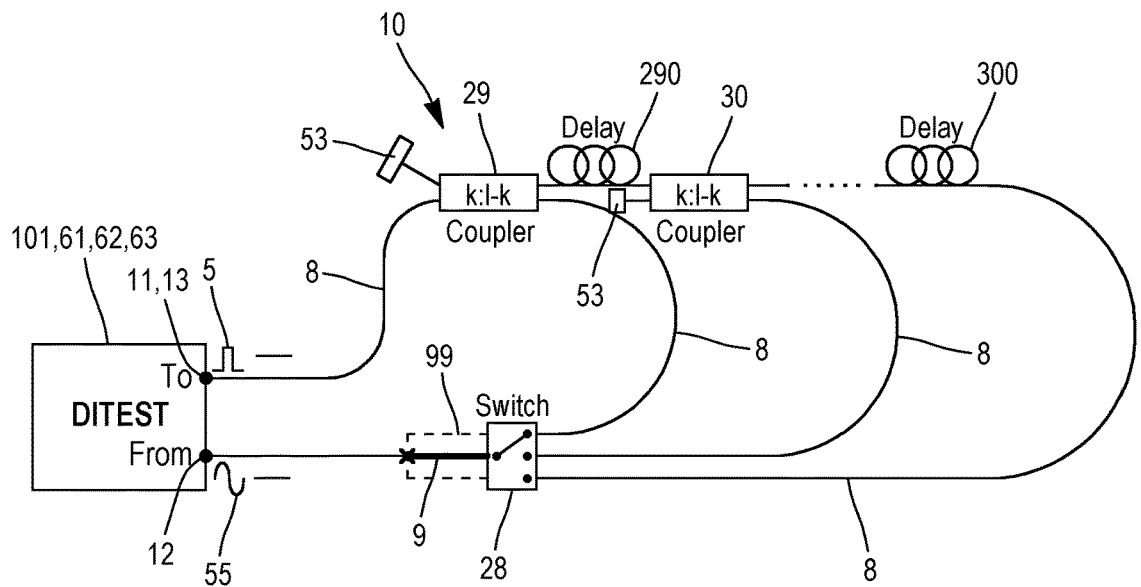
FIG. 15 illustrates a ninth embodiment of a device 10 according to the invention.
Figure 16:
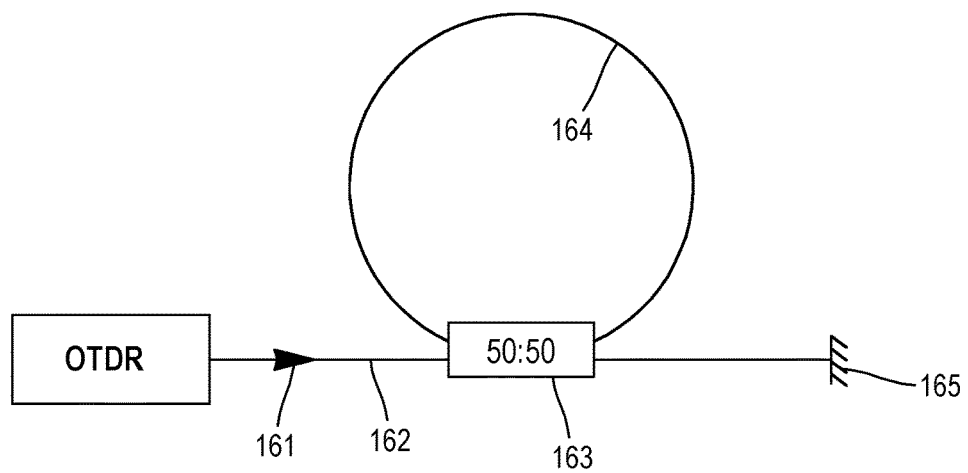
FIG. 16 illustrates a calibration device according to prior art.

We are now going to describe the common features of the "non-loop" embodiments of FIGS. 14 to 15 according to the invention.

In these embodiments, the device 10 comprises:
a second input 12 arranged for:
being connected to a second emitter 62 arranged for emitting a continuous probe signal 55, and
receiving this continuous probe signal 55,
injecting this continuous probe signal 55 towards the optical fiber 8.
The first input 11 and the second input 12 are located at two different locations.

FIG. 14 illustrates the eighth embodiment of device 10 according to the invention.

In this embodiment, the means for creating different optical paths comprises a cavity arranged for making the at least one optical pulse signal 5 travelling back and forth in the cavity.

The at least one event 9 is in the cavity.
The cavity is delimited by two fiber Bragg gratings 25, 27.
The device 10 comprises means arranged for conducting the probe 55 into the cavity, but the device 10 is arranged so that the probe 55 cannot travel back and forth in the cavity.
A circulator 43 comprises three ports:
one port 1 linked to one end 27 of the cavity (grating 27)
one port 2 linked to input 11
one port 3 linked to a coupler 26.
The other end 25 of the cavity (the other grating 25) is connected to the input 12.

The at least one event 9 is located between the other end 25 of the cavity (the other grating 25) and the coupler 26.

Only each pump 5 travels back and forth in the cavity. The probe 55 goes through the FBG 25, 27. The probe 55 then goes to the circulator port 1 and is forwarded to circulator port 2.

The coupler 26 is inside the cavity.

Since pump 5 and probe 55 are shifted by about 11 GHz in frequency, it would theoretically be possible to perform a separation operation by classical filtering. Although the setup depicted in FIG. 14 does not exhibit a loop architecture, it behaves somehow identically since the cavity formed by the two fiber Bragg gratings (FBG) 25, 27 in presence make the pump 5 travel back and forth. Since no interaction occurs when pump 5 and probe 55 are co-propagating, an event detection is detected after each round trip of a pulse 5 in the cavity. Such concept is unfortunately not perfect for "Stimulated Brillouin scattering" (also called SBS) as the signals are very close in frequency from an optical point of view, and it is difficult for classical FBGs to achieve a complete separation of the sidebands and the laser central frequency. In addition, the presence of the two sidebands preferably requires the use of a very narrow band-pass filter. Such architecture is of interest for other processes such as for example "stimulated Raman scattering" (also called SRS), which share some common properties with SBS, with one major difference being the frequency induced by the interaction which lies in the terahertz range.

FIG. 15 illustrates the ninth embodiment of device 10 according to the invention.

In this embodiment, the means for creating different optical paths comprises:
an optical switch 28 arranged for selecting one optical path among the different optical paths, and
couplers respectively 29, 30, . . . linking all the different optical paths, each path comprising a fibered delay line respectively 290, 300, . . . .

The at least one event 9 is between the input 12 and the switch 28.

Unlike other setups presented previously, this embodiment avoids using a loop 7 when addressing the problem of detecting the same event 9 on multiple distances. Optical switch 28 and multiple delay lines 290, 300, . . . are being used instead. One possible implementation is depicted in FIG. 15. It also requires the use of several couplers 29, 30, . . . . The operating principle of such a setup is much simpler and more intuitive than the previous ones.

In each embodiment of device 10, the at least one event 9 can comprise (as illustrated in FIG. 8) a plurality of events 9, comprising fiber segments of a second type of fiber 92, the segments (respectively 921, 922, 923, 924, 925) of the second type 92 having different lengths, preferably an increasing length.

Fiber 8 also comprises fiber segments of a first type of fiber 91, which is preferably not the same type of fiber than all the other part of fiber 8 (8a, etc) which are not events 9; it limits parasitic effects.

The fiber segments of the two different types of fibers 91, 92 are alternately positioned.

Each segment 92 (among all the segments 92 or among a least a plurality of the segments 92, but not necessarily all the segments 92 as illustrated in FIG. 8) are preferably at least 33% shorter than each surrounding segment 91 to which it is connected to.

As seen previously:
Rayleigh scattering is the interaction of a light pulse 5 with material impurities; It can be used also for temperature and strain measurement.

Brillouin scattering is the interaction of a light pulse 5 with thermally excited acoustic waves. The Brillouin frequency shift is temperature and strain dependent.

Raman scattering is the interaction of a light pulse 5 with thermally excited molecular vibrations The Raman Anti-Stokes component intensity is temperature dependent whereas the Stokes component is nearly temperature insensitive so that temperature measurement is possible.

Distributing sensing technologies are known for measuring a temperature, a strain, a position, a pressure, a vibration, and/or birefringence properties in an optical fiber.

Distributing sensing technologies have also a specific spatial resolution.

All those properties of a distributing sensing apparatus 101 need sometimes to be calibrated or checked.

Thus, we are now going to describe embodiments of a process implemented by the previous embodiments of a device 10 according to the invention.

Each one of these embodiments of a process according to the invention for calibrating the distributing sensing technology apparatus 101 comprises the following steps:
the emitter 61 of apparatus 101 is connected to the first input 11 and emits the at least one optical pulse 5,
the analysis means 63 of apparatus 11 are connected to the output 13 and analyzes the backscattered signal generated by the at least one event 9 in the optical fiber, and optionally, in the specific cases using a probe 55 (see for example FIGS. 3, 4, and 11 to 15), the emitter 62 of apparatus 101 is connected to the second input 12 and emits the probe 55.

Then two options, which can be combined with each other, can be implemented.

In the first option, the analysis of the backscattered signal gives a measured value of an information concerning the at least one event 9.

Typically, this first option comprises the step of calibrating (e.g. comparing the measured value with a reference value of the information).

If the difference between the measured value and the reference value is above a threshold value, it comprises the step of adjusting (or correcting a calibration of) the analysis means 63 used for measuring the measured value.

The information is typically:
a position, a temperature, a strain, a pressure, an acoustic vibration, and/or birefringence properties of the event 9 or one of the events 9, and/or
an amplitude and/or a frequency of the backscattered signal corresponding to this event 9, and/or
a spatial distance between two different events 9 or difference of length between two of the different optical paths passing through the same event 9.

In the second option, the analysis of the backscattered signal measures a spatial resolution for detecting the at least one event 9.

The spatial resolution is typically calculated from a spatial width of a slope 31 of a backscattered signal corresponding to one event 9.

In one example illustrated in FIG. 8, the at least one event 9 comprises a plurality of events 9, comprising fiber segments of a second type of fiber 92, the segments (respectively 921, 922, 923, 924, 925) of the second type 92 having different lengths, preferably an increasing length along the loop 7.

Fiber 8 also comprises fiber segments of a first type of fiber 91, which is preferably not the same type of fiber than all the other part of fiber 8 (8a, etc) which are not events 9.

The fiber segments of two different types of fibers 91, 92 are alternately positioned.

Each segment 92 (among all the segments 92 or among a least a plurality of the segments 92, but not necessarily all the segments 92 as illustrated in FIG. 8) are preferably at least 33% shorter than each surrounding segment 91 to which it is connected to.

The spatial resolution is measured from the amplitudes of different backscattered signals corresponding to the different segments of the second type of fiber 92. Typically the spatial resolution is measured from:
the amplitudes of different Raman backscattered signals corresponding to the different segments of the second type of fiber 92, and/or
the Brillouin frequencies of different backscattered signals corresponding to the different segments of the second type of fiber 92, and/or
the Rayleigh frequencies of different backscattered signals and/or the amplitudes of different Rayleigh backscattered signals, corresponding to the different segments of the second type of fiber 92, We are now going to describe a more specific example of process according to the invention, implemented for BOTDA (for example by device 10 of FIG. 3 or 4), in references to FIGS. 5 to 6.

Figure 5:
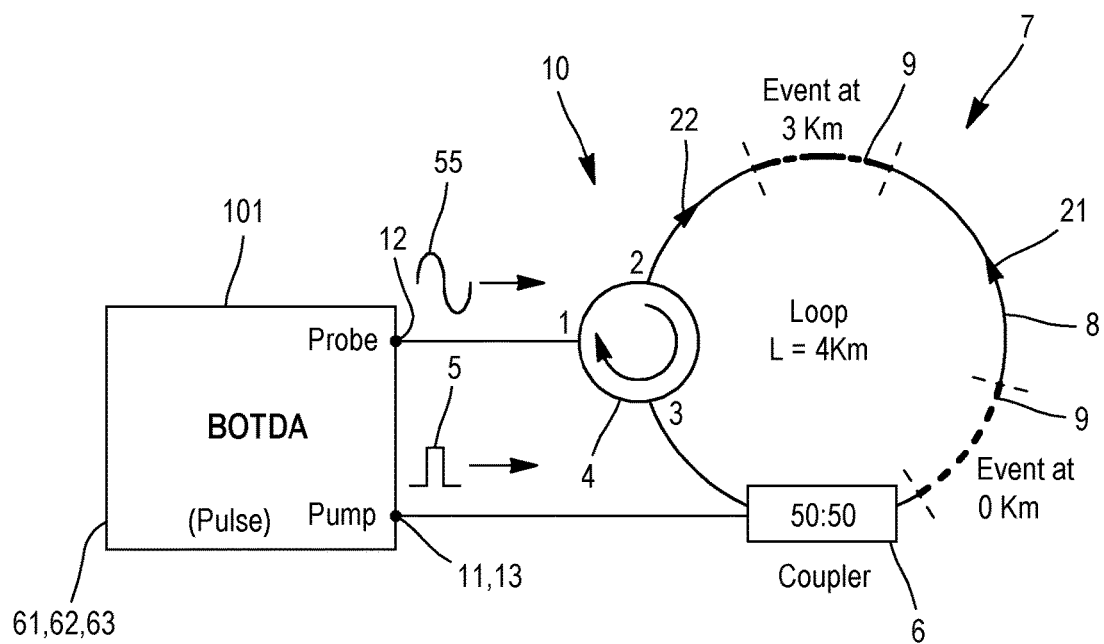
FIG. 5 is a schematic view of the device 10 of FIG. 3 or 4, further illustrating two possible positions of an event 9.
Figure 6:
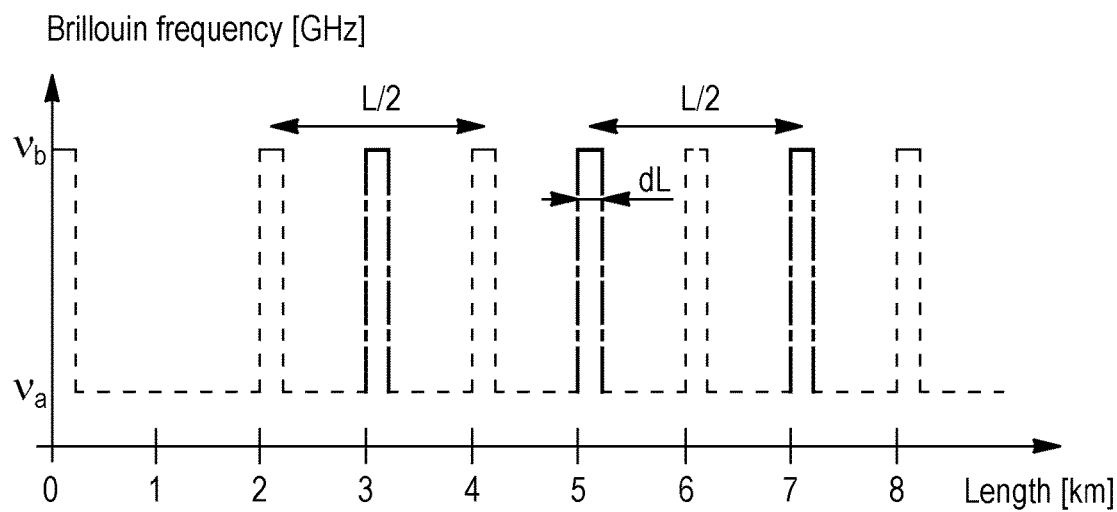
FIG. 6 illustrates the backscattering signals obtained with the device 10 of FIG. 5.

The Brillouin frequency response of a fiber depends on its type and manufacturing process. By combining for instance two different fibers a (for the loop 7 but not the at least one event 9, 92) and b (for the at least one event 9, 92) with Brillouin frequencies $v_a$ and $v_b$, as illustrated in FIG. 5, so that the recirculating loop has the Brillouin frequency $v_a$ and each event has the Brillouin frequency $v_b$ of length dL, one defines an event that can be used for spatial resolution (the length dL), distance (the spacing of the event due to multiple pump round trip) and Brillouin frequency.

Note that if to be used as Brillouin frequency calibration system, the event 9 must be stabilized in temperature and free of any strain.

For the sake of the discussion let's consider the event 9 at distance 0 km in the loop 7. During the first interaction, the event backscattering is seen as soon as the pump 5 enters the loop 7 and is therefore located at distance 0 km. The pump 5 travels then the total loop length before reaching the event 9 for the second time. But again the event backscattering goes directly to the detection system and does not propagate within the loop 7. The system is designed so that the backscattering travels as long as the pump 5 before being measured. As this is not the case here, distance are separated by half the pump propagation time in the loop 7, thus by half the loop length.

The event 9 can be a bit more complex that a simple length of fiber with frequency $v_b$; in can be a series of different lengths of fiber 92 with frequency $v_b$ separated by the regular loop fiber 91 so that different spatial resolution can be tested.

It is also possible to design a long event 9 off which a section is under controlled strain or controlled temperature, etc. so that the Brillouin frequency is shifted by the strain or the temperature. This provides a mean of validating the instrument performances.

The coupling ratio of the loop 7 can be optimized, especially when no EDFA is added to the loop 7 and when the pump power can be easily tuned. In this case, less than 50% is coupled in the loop initially (this can be compensated by boosting the pump power) but then more than 50% stays in the loop 7 at each round trip. The optimum depends on the circulator and splice loss and is typically around 70%.

The scheme works for other Brillouin stimulated systems like Brillouin optical frequency domain analysis and Dynamic Brillouin Gratings.

We are now going to describe another more specific example of process according to the invention, implemented for BOTDA (for example by device 10 of FIG. 3 or 4), that can be combined with the previous example.

The loop 7 comprises fiber segments 91, 92 of different lengths which are spliced together, as illustrated in FIG. 8 (the length of each segment 91, 92 is indicated in the curve surrounding the segments 91, 92; unit is meter). These segments 91, 92 were taken from two fiber spools supposed to be identical (same model and manufacturer). Their Brillouin gain curves are very similar and shifted of 11 MHz with respect to each other as shown in FIG. 7. This way, detrimental effects such as pump depletion will impact the two gain curves in a similar fashion, avoiding a configuration in which part of an event is being affected by parasitic phenomena while the other is not.

Thus, the loop 7 comprises multiple events 9 corresponding to the multiple segments 92 of different lengths.

The events 9 are intended to provide a validation of the instrument spatial resolution at 1, 2 and 3 meters.

Spatial resolution is a measurement of the instrument's ability to detect events of finite length. Although multiple definitions for spatial resolution exist, it was decided here to make use of the one given by SEAFOM (Subsea Fiber Optic Monitoring Group) in a guide published in March 2010 [6] which applies to DTS. Given an event (i.e. a temperature change) which length equals the spatial resolution of the instrument 101, the device must be able to detect the change within a specified tolerance range (90%-100%). Any event 9 shorter than the spatial resolution must fall outside of these boundaries whereas a much longer event 9 shall be integrally detected (minus the spatial resolution).

For BOTDA, such criterion might not be satisfied in case of inadequate sampling distance to spatial resolution ratio. Consider an event 9 which length equals the spatial resolution of the instrument and a sampling interval that equals half the spatial resolution. The event 9 can be fully detected if one of the samples is acquired at a time corresponding to an overlap between the pulse 5 and the event 9 (best case scenario). The other extreme case (worst case scenario) happens for sampling times corresponding to 25% and 75% of pulse 5 and event 9 overlapping. In the worst case scenario, the event 9 will therefore only be detected to 75% of its value.

Measurements at 1 m, 2 m and 3 m of spatial resolutions were performed on an apparatus 101 corresponding to DITEST-Vision from Omnisens (FIG. 9 et 10). Each measurement of FIGS. 9 and 10 depicted here is the result of an average performed on ten repeated traces.

In FIGS. 9 and 10, each peak or step respectively 821, 822, 823, 824, 825 represents a backscattered signal corresponding to event respectively 921, 922, 923, 924, 925 having a length of respectively 0.5, 1, 2, 3, 20 meters.

On these FIGS. 9, 10 are shown the tolerable interval 32, 33 as defined by SEAFOM together with the slope 31 or linear fitting performed on the longest event rising edge.

By analyzing, in FIG. 9, the height of the peak 821 representing a backscattered signal corresponding to event 921 having a length of 0.5 meter, the process deduces that spatial resolution of 0.5 meter is not achieved.

By analyzing, in FIG. 9, the height of the peak 822 representing a backscattered signal corresponding to event 922 having a length of 1 meter, the process deduces that spatial resolution of 1 meter is achieved.

By analyzing, in FIG. 10, the width of the slope 31 of step 825 representing a backscattered signal corresponding to event 925, the process deduces the value of the spatial resolution of the tested apparatus 101 (approximatively equal to 1 meter).

The previously described calibration process (in particular for BOTDA) can also be adapted to Brillouin Optical Frequency Domain Analyzer (BOFDA).

Other embodiments of a calibration process according to the invention can be implemented:

in device 10 of FIG. 1 or 2, or in device 10 of any one of FIG. 3, 4, 11, 12, 13, 14, or 15, without emitting the probe 55 and by modifying this device 10 by suppressing the emitter 62 and/or any part of the device specifically dedicated to the circulation of the probe 55, in particular:

for Brillouin Optical Time Domain Reflectometer (also called BOTDR) or Brillouin Optical Frequency Domain Reflectometer (BOFDR). BOTDR works similarly to a BOTDA both for time of flight measurement and for frequency analysis. The difference is the absence of stimulation by the probe 55.

for Raman backscattering, in particular for "Distributed Temperature sensing" (DTS). Raman backscattering is used for temperature measurement. The time of flight measurement is similar to BOTDR. The Raman signal itself corresponds to the intensity of the backscattered lines. Distance calibration and spatial resolution calibration is given by the loop length and the event length. Temperature calibration is achieved by applying successively two known and controlled temperatures (or only one known and controlled temperature, with some theoretical hypothesis about the used fiber(s)) on the first measured event and by checking that all subsequent events are measured correctly. The artefact for Raman DTS can be based on either single mode or multimode fiber, depending on the instrument type.

for Rayleigh backscattering, in particular for:

"Distributed Acoustic Sensing" (also called DAS). The recirculating loop 7 is similar to the BOTDR. Compensation of the loss within the loop 7 can be considered here as well. The event 9 can be a section of fiber that is actively vibrated, for instance using a piezo-electric actuator. Spatial resolution can be defined by the distance between two adjacent such actuators within the loop 7. The two events 9 must be identified independently to prove that they are spaced by the spatial resolution.

"Distributed Temperature sensing" (DTS) and "Distributed Strain Sensing" (DSS). The Rayleigh backscattering can be used to measure temperature or strain effect along a fiber similarly to a Brillouin based system. This is achieved by scanning the laser wavelength and working on the auto-correlation of two successive scans of the Rayleigh spectrum. As Rayleigh based DTS and DSS are not stimulated systems, the recirculating loop is similar to the BOTDR case. Gain is applicable.

Rayleigh and Brillouin backscattering can be used to measure distribute pressure (DPS) by mean of a pressure to strain conversion mechanism. This can be applied on the event for calibration of DPS.

Likewise, so call Dynamic Brillouin Grating can be used for DPS with a similar event.

Birefringence measurement, related to DPS in some cases, can also be used for a reference event.

For Rayleigh or Brillouin backscattering, all the optical fibers of any embodiment of device 10 are preferably single mode fibers.

For Raman backscattering, all the optical fibers of any embodiment of device 10 are preferably multimode fibers.

For Brillouin backscattering, the wavelength of each pulse signal 5 and/or of the probe signal 55 is typically between 1530 nm and 1560 nm, but when considering Raman, it could be as low as 1060 nm. Then, in a general way, the wavelength of each pulse signal 5 and/or of the probe signal 55 is typically between 1000 nm and 1600 nm.

In the previous device 10 and process embodiments, a full metrological traceability of the artefact to the corresponding national standards is preferred in order to make out of the artefact a true reference for the calibration of distributed sensing systems.

The length of the loop 7 can be measured using a calibrated OTDR or using traceable time of flight or interferometric methods.

The length and location of each event 9 can be measured using similar techniques.

For Brillouin system and for Rayleigh when used for temperature and strain measurements, namely for systems that require a controlled frequency shift, it is possible to use a beat signal in the electrical domain and a traceable frequency counter to calibrate the frequency shift as a function of the reference temperature.

When temperature, strain, pressure, vibration, birefringence or other effects are used as event, they are preferably calibrated against reference systems.

Of course, the invention is not limited to the examples which have just been described and numerous amendments can be made to these examples without exceeding the scope of the invention.

For example:

in variants of the previously described embodiments, the coupler 6 can be replaced by a synchronized optical switch and/or a set of different polarizers.

Of course, the different characteristics, forms, variants and embodiments of the invention can be combined with each other in various combinations to the extent that they are not incompatible or mutually exclusive. In particular all variants and embodiments described above can be combined with each other.

REFERENCES CITED

[1] Culshaw B. (2004). Optical fiber sensor technologies: opportunities and-perhaps-pitfalls. Journal of Lightwave Technology, 22, p. 39-50.
[2] Derickson D. (1998). Fiber Optic Tests and Measurements. Prentice Hall.
[3] Kersey A. D. (1996). A review of recent developments in fiber optic sensor technology. Optical Fiber Technology, 2, p. 291-317.
[4] Kurashima T., Horiguchi T., Tateda M. (1990). Distributed-temperature sensing using stimulated Brillouin scattering in optical silica fibers. Opt. Lett., 15, no 8, p. 1038-10-140.
[5] Nikles M., Thevenaz L., Robert P. A. (May 1996). Simple distributed fiber sensor based on Brillouin gain spectrum analysis. Optics Letters, 21, no 10, p. 758-760.
[6] SEAFOM, Measurement Specification for Distributed Temperature Sensing+APPENDIX, 2010

The invention claimed is:

1. A calibration process implemented in an optical calibration device comprising an optical fiber, and a first input, the first input being arranged for:
   being connected to a first emitter arranged for emitting at least one optical pulse;
   receiving this at least one optical pulse;
   injecting this at least one optical pulse towards the optical fiber;
the device further comprising an output arranged for:
   receiving a back scattered signal generated in the optical fiber;
   being connected to analysts means arranged for analyzing the back scattered signal generated in the optical fiber;
the optical fiber comprising at least one event, each event being a part of the optical fiber and having at least one modified physical state or property that is different from the physical state or property of the rest of the optical fiber; and
the device comprising means for creating different optical paths for the at least one optical pulse, the different optical paths having different lengths, each optical path passing through the at least one event;
the process further including that:
   the emitter is connected to the first input and emits the at least one optical pulse;
   the analysis means are connected to the output and analyzes the backscattered signal generated by the at least one event in the optical fiber;
the analysts of the backscattered signal giving a measured value of an information concerning the at least one event;
the process further comprising the step of comparing the measured value with a reference value of the information, and when the difference between the measured value and the reference value is above a threshold value, it comprises the step of correcting a calibration of the analysis means used for measuring the measured value;
the information being:
   a position, a temperature, a strain, a pressure, an acoustic vibration, and/or birefringence properties of one event; and/or
   an amplitude and/or frequency of the backscattered signal corresponding to one event; and/or
   a spatial distance between two different events or difference of length between two of the different optical paths passing through the same event.

2. The process according to claim 1, characterized in that the analysis of the backscattered signal measures a spatial resolution for detecting the at least one event.

3. The process according to claim 2, characterized in that the spatial resolution is calculated from a spatial width of a slope of a backscattered signal corresponding to one event.

4. The process according to claim 2, characterized in that the at least one event comprises a plurality of events, comprising segments of a second type of fiber, the segments of the second type having different lengths, the fiber comprising fiber segments of a first type of fiber-, the fiber segments of two different types of fibers being alternately positioned; and
   the spatial resolution being measured from different backscattered signals corresponding to the different segments of the second type of fiber.

5. The process according to claim 1, characterized in that the backscattered signal is a Rayleigh backscattered signal, a Brillouin backscattered signal, and/or a Raman backscattered signal.

6. The process according to claim 1, characterized in that:
the at least one event comprises a part of optical fiber having at least one physical state different compared to the rest of the optical fiber, this at least one different physical state being a temperature, a strain, a pressure, an acoustic vibration; and/or
the device comprises means for applying, to the at least one event, at least one known physical state, the means for applying at least one known physical state comprising for example a thermostat, means for applying a known pressure or force or strain, and/or means for applying a known vibration.

7. The process according claim 1, characterized in that the at least one event comprises a part of optical fiber having at least one physical property different compared to the rest of the optical fiber, this at least one different physical property being for example a spatial dimension, a material or birefringence properties.

8. The process according to claim 1, characterized in that the at least one event comprises a plurality of events, comprising segments of a second type of fiber, the segments of the second type having different lengths, the fiber comprising fiber segments of a first type of fiber, the fiber segments of two different types of fibers being alternately positioned.

9. The process according to claim 1, characterized in that all the fibers in the device are multimode fibers.

10. The process according to claim 1, characterized in that the first input and the output are located at the same location.

11. The process according to claim 1, characterized in that the means for creating different optical paths comprises:
a coupler;
an optical loop;
the coupler being inserted into the optical loop, and being arranged in such a way that:
when an optical signal enters inside the coupler from the loop with a first circulation direction, this optical signal is at least partially re-injected in the loop with the first circulation direction; and
when an optical signal enters inside the coupler from the loop with a second circulation direction, this optical signal is at least partially ejected outside the loop towards the output and/or towards the analysis means.

12. The process according to claim 11, characterized in that the coupler is arranged in such a way that when the optical signal enters inside the coupler from the loop with the first circulation direction, this optical signal is partially re-injected in the loop with the first circulation direction, and is partially ejected outside the loop.

13. The process according to claim 11, characterized in that the coupler is arranged in such a way that when the optical signal enters inside the coupler from the loop with the second circulation direction, this optical signal is partially ejected outside the loop towards the output and/or towards the analysis means, and is partially re-injected in the loop with the second circulation direction.

14. The process according to claim 11, characterized in that the device used for implementing the process comprises an optical amplifier in the optical loop, said amplifier being arranged for amplifying the optical signal traveling in the loop in the first direction.

15. The process according to claim 14, characterized in that the coupler is located in the loop after the amplifier and before the at least one event, following the first circulation direction.

16. The process according to claim 11, characterized in that the at least one event is in the optical loop.

17. The process according to claim 11, characterized in that the device used for implementing the process further comprises means for avoiding that an optical signal makes two turns or more in the loop following the second circulation direction, preferably comprising:
a polarizer in the loop; or
a circulator in the loop.

18. The process according to claim 11, characterized in that the coupler is connected to the first input and/or to the first emitter and is arranged in such a way that, after being emitted and/or received by the first input, the at least on optical pulse enters the coupler, and is at least partially injected in the loop with the first circulation direction.

19. The process according to claim 18, characterized in that the coupler is arranged in such a way that, after being emitted and/or received by the first input, the at least on optical pulse enters the coupler, and is partially injected in the loop with the first circulation direction, and is partially ejected outside the loop.

20. The process according to claim 1, characterized in that the device used for implementing the process further comprises:
a second input being arranged for:
being connected to a second emitter arranged for emitting a probe signal;
receiving this probe signal; and
injecting this probe signal towards the optical fiber.

21. The process according to claim 20, characterized in that the first input and the second input are located at two different locations.

22. The process according to claim 20, characterized in that the device used for implementing the process further comprises means for injecting the probe in a loop.

23. The process according to claim 22, characterized in that the means for injecting the probe in the loop comprises a circulator, the circulator being inserted into the loop and being connected to the second input and/or to the second emitter, the circulator being arranged in such a way that, after being emitted and/or received by the second input, the probe signal enters the circulator, and is at least partially injected in the loop.

24. The process according to claim 23, characterized in that the circulator is arranged in such a way that, after being emitted and/or received by the second input, the probe signal enters the circulator, and is injected in the loop.

25. The process according to claim 23, characterized in that the coupler is located in the loop after the circulator and before the at least one event, following the first circulation direction.

26. The process according to claim 23, having an optical amplifier in an optical loop, said amplifier being arranged for amplifying an optical signal traveling in the loop in a first direction, characterized in that the amplifier is located in the loop after the circulator and before the coupler, following a first circulation direction.

27. The process according to claim 23, characterized in that the only possible circulation direction trough the circulator in the loop is the first circulation direction, and not the second circulation direction.

28. The process according to claim 22, characterized in that the means for injecting the probe in the loop comprises the coupler.

29. The process according to claim 22, characterized in that the means for injecting the probe in the loop are arranged for at least partially injecting the probe in the loop with the second circulation direction.

30. The process according to claim 20, characterized in that the device used for implementing the process comprises no means for injecting the probe in the loop, such that the probe cannot be directed into the loop.

31. The process according to claim 30, characterized in that the at least one event is outside the optical loop.

32. The process according to claim 1, characterized in that the means for creating different optical paths comprises a cavity arranged for making the at least one optical pulse signal travelling back and forth.

33. The process according to claim 32, characterized in that the at least one event is in the cavity.

34. The process according to claim 32, characterized in that the cavity is delimited by two fiber Bragg gratings.

35. The process according to claim 1, characterized in that the means for creating different optical paths comprises:
   an optical switch arranged for selecting one optical path among the different optical paths; and
   couplers linking all the different optical paths.

36. An optical calibration device comprising an optical fiber, and a first input,
   the first input being arranged for:
      being connected to a first emitter arranged for emitting at least one optical pulse,
      receiving this at least one optical pulse;
      injecting this at least one optical pulse towards the optical fiber;
   the device further comprising an output arranged for:
      receiving a backscattered signal generated in the optical fiber;
      being connected to analysis means arranged for analyzing the backscattered signal generated in the optical fiber;
   the optical fiber comprising at least one event, each event being a part of the optical fiber and having at least one modified physical state or property that is different from the physical state or property of the rest of the optical fiber; and
   the device comprising means for creating different optical paths for the at least one optical pulse, the different optical paths having different lengths, each optical path passing through the at least one event;
   wherein the means for creating different optical paths comprises:
      a coupler;
      an optical loop;
   the coupler being inserted into the optical loop, and being arranged in such a way that:
      when an optical signal enters inside the coupler from the loop with a first circulation direction, this optical signal is at least partially re-injected in the loop with the first circulation direction; and
      when an optical signal enters inside the coupler from the loop with a second circulation direction, this optical signal is at least partially ejected outside the loop towards the output and/or towards the analysis means.

* * * * *